United States Patent
Green

(10) Patent No.: US 6,859,858 B2
(45) Date of Patent: Feb. 22, 2005

(54) METHODS AND APPARATUSES FOR CONTENT-BASED SPEED VARIATION OF AN OPTICAL STORAGE DRIVE

(75) Inventor: Carl I. Green, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 09/990,488

(22) Filed: Nov. 15, 2001

(65) Prior Publication Data

US 2003/0093617 A1 May 15, 2003

(51) Int. Cl.[7] .............................................. G06F 12/00
(52) U.S. Cl. ...................... 711/112; 369/14; 369/53.3
(58) Field of Search ........................... 711/112; 369/14, 369/53.3

(56) References Cited

U.S. PATENT DOCUMENTS

| | | | |
|---|---|---|---|
| 5,666,334 A | * | 9/1997 | Tokuyama et al. ............ 369/14 |
| 6,118,652 A | * | 9/2000 | Casby et al. ................ 361/517 |
| 6,131,138 A | * | 10/2000 | Packer et al. ................... 711/4 |
| 6,400,892 B1 | * | 6/2002 | Smith ......................... 386/125 |
| 6,469,967 B1 | * | 10/2002 | Mau et al. .................. 369/53.3 |
| 2002/0036959 A1 | * | 3/2002 | Yen et al. ................... 369/47.4 |
| 2002/0097515 A1 | * | 7/2002 | Antonio et al. ........... 360/73.03 |
| 2002/0159365 A1 | * | 10/2002 | Yamashita et al. ........ 369/53.37 |
| 2002/0186630 A1 | * | 12/2002 | Komaki ................... 369/47.33 |
| 2003/0007429 A1 | * | 1/2003 | Cheng ..................... 369/30.26 |
| 2003/0099176 A1 | * | 5/2003 | Okada ..................... 369/53.18 |

* cited by examiner

*Primary Examiner*—Hiep T. Nguyen
(74) *Attorney, Agent, or Firm*—Blakely, Sokoloff, Taylor & Zafman LLP

(57) ABSTRACT

An optical storage drive having a content-based drive-speed variation capability. The optical storage drive contains a drive speed lookup table that stores drive speeds corresponding to file types or groups of file types. For a given file type, a corresponding coded drive speed is provided to the motor control hardware registers. Based upon the coded drive speed provided the drive voltage is limited to produce a desired drive speed. In one embodiment, the optical storage drive may reduce energy consumption by ascertaining the file type to be read and rotating the optical disk at a reduced speed based upon the file type.

27 Claims, 4 Drawing Sheets

METHODS AND APPARATUSES FOR CONTENT-BASED SPEED VARIATION OF AN OPTICAL STORAGE DRIVE

FIELD OF THE INVENTION

This invention relates generally to optical storage drives, and more specifically, to reducing the power consumption of such devices.

BACKGROUND OF THE INVENTION

A major emphasis of mobile computing system (MCS) development is to increase battery life without increasing the battery size. This can be done by decreasing the energy consumption of the MCS. The optical storage drive of a MCS is high on the list of energy consuming components (the display screen and the hard drive, being perhaps the only worse offenders). A compact disc (CD) drive or a digital versatile disc (DVD) drive may consume up to 20% of a system's energy.

There are many optical storage disk formats including CD audio, CD-R, CD-RW, DVD-RAM, DVD-ROM, and DVD-video. These disks can be read at different rates. Optical storage drives having various drive speeds have been developed with the drive speeds usually designated in reference to a base multiplier X. The base multiplier represents the time it took to read data from a CD in its original format, which was 150 kilobytes per second (kbps). Therefore a 1X drive speed accommodated a data transfer rate of 150 kbps, a 2X drive speed accommodated a data transfer rate of 300 kbps, etc. A 1X drive speed corresponds to the disc spinning within the drive at between 200 and 500 RPMs. CDs with successively faster data transfer rates have been developed. Optical storage drives to accommodate these data transfer rates may have drive speeds of 12X, 24X or 52X. These drive speeds may correspond to proportionately higher disk rotational speeds. For example an 8X drive speed may spin the disk within the drive at between 1600 and 4000 RPMs. Some storage media such as DVD may be much denser than a CD, and therefore, be able to transfer data at much higher rates without a proportional increase in disk rotational speed.

Many optical storage drives are designed to support reading from various types of optical storage media. For example, MultiRead, MultiRead2, and Multiplay are Optical Storage Technology Association (OSTA) designations for devices that can read multiple formats such as DVD-ROM, DVD-Video, CD, CD-R, CD-RW, and others. These devices are typically fixed speed, with that speed corresponding to the highest speed that may be required for applications that the device supports. These devices may therefore spin disks much faster than required for a particular content of a disk. For example, a Multiplay device that is reading an audio CD may spin the disk at the same speed as if it were reading DVD-video. Therefore energy is being consumed to keep the audio CD spinning at a rate that may be many times faster than required to transfer audio CD data. The disk is rotating at a high rate, but only being accessed periodically as required to read the audio data.

An optical storage drive typically consumes a relatively large amount of energy to get the disk rotating at a given speed, after which the energy consumption is dependent to a large extent on the speed at which the disk is rotating.

FIG. 1 illustrates energy consumption for reading DVD-Video at, for example 12X, as compared to reading an audio CD at, for example 1X. Graph 105 shows the energy consumption for a DVD. At $t_0$ the disk is at rest, as illustrated there is some energy consumption associated with holding the disk at rest. At $t_1$ there is a surge in energy consumption to get the disk rotating at the desired speed. This surge is known as in-rush current and may spike as high as 3.5 watts. After the disk is rotating, at $t_2$, there is a steady consumption of energy that may be approximately 0.75 watts. At $t_3$ the disk returns to rest. Graph 110 shows the energy consumption for a CD audio. As shown, graph 110 has similar characteristics to that of 105, but uses less energy. At $t_1$ the surge in energy consumption may be less than 3.5 watts. In general it may take almost as much energy to get the disk spinning, but the energy required to keep the disk rotating at a slower speed may be significantly less. For example, a speed of 1X may require only approximately 0.25 watts to maintain.

More energy is required to get the disk rotating at a higher speed and to keep it rotating at a higher speed. Therefore, Multiplay devices may consume more energy than necessary by rotating a disk at a higher speed than necessary.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

One embodiment of an optical storage drive reduces energy consumption by ascertaining the file type to be read and rotating the optical disk at a reduced speed based upon the file type. In one embodiment the optical storage device contains a drive-speed lookup table stored in a memory. The file type is used to index the table to obtain a corresponding drive speed. In one embodiment a coded speed is input into the motor control hardware register to limit the drive voltage thereby limiting the drive speed.

In the following detailed description, numerous specific details are set forth to provide a thorough understanding of the present invention. However, it will be apparent to one skilled in the art that the present invention may be practiced without theses specific details. In some instances, well-known structures and devices are shown in block diagram form, rather than in detail, in order to avoid obscuring the present invention.

Figure 1:
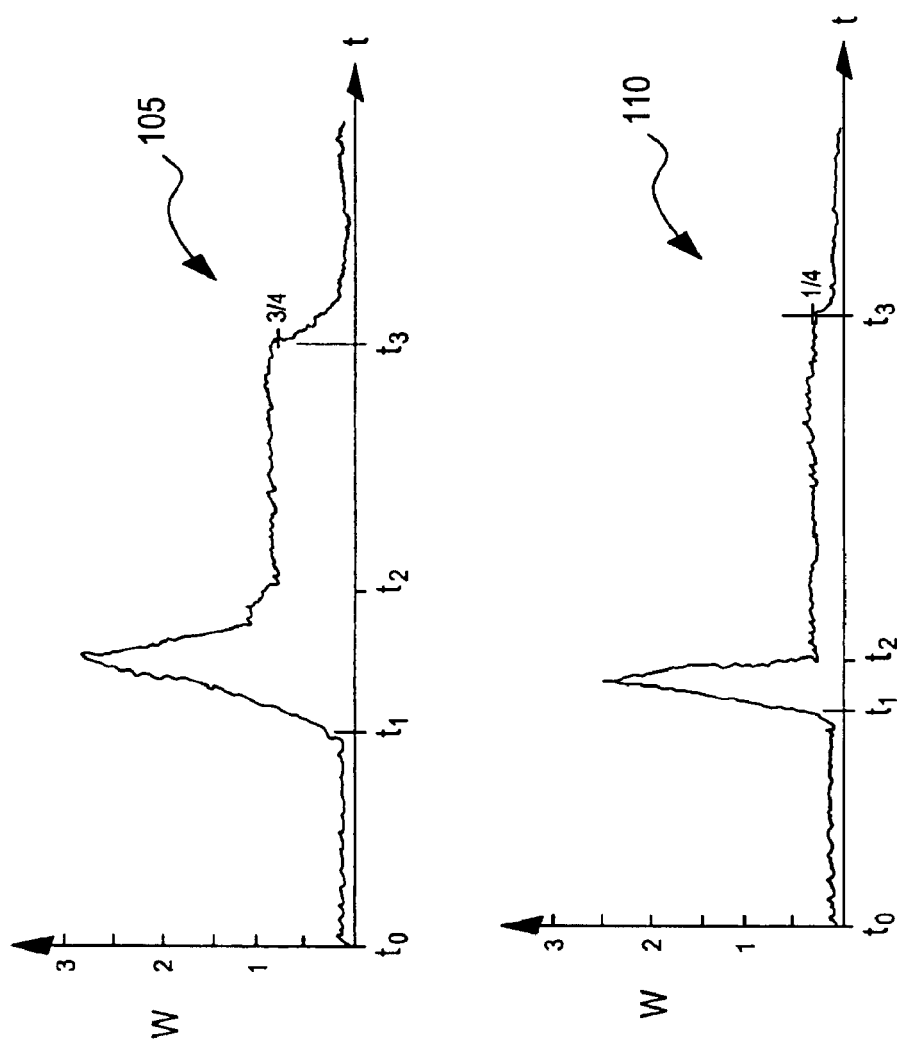
FIG. 1 illustrates energy consumption for a DVD and an audio CD in accordance with the prior art.
Figure 2:
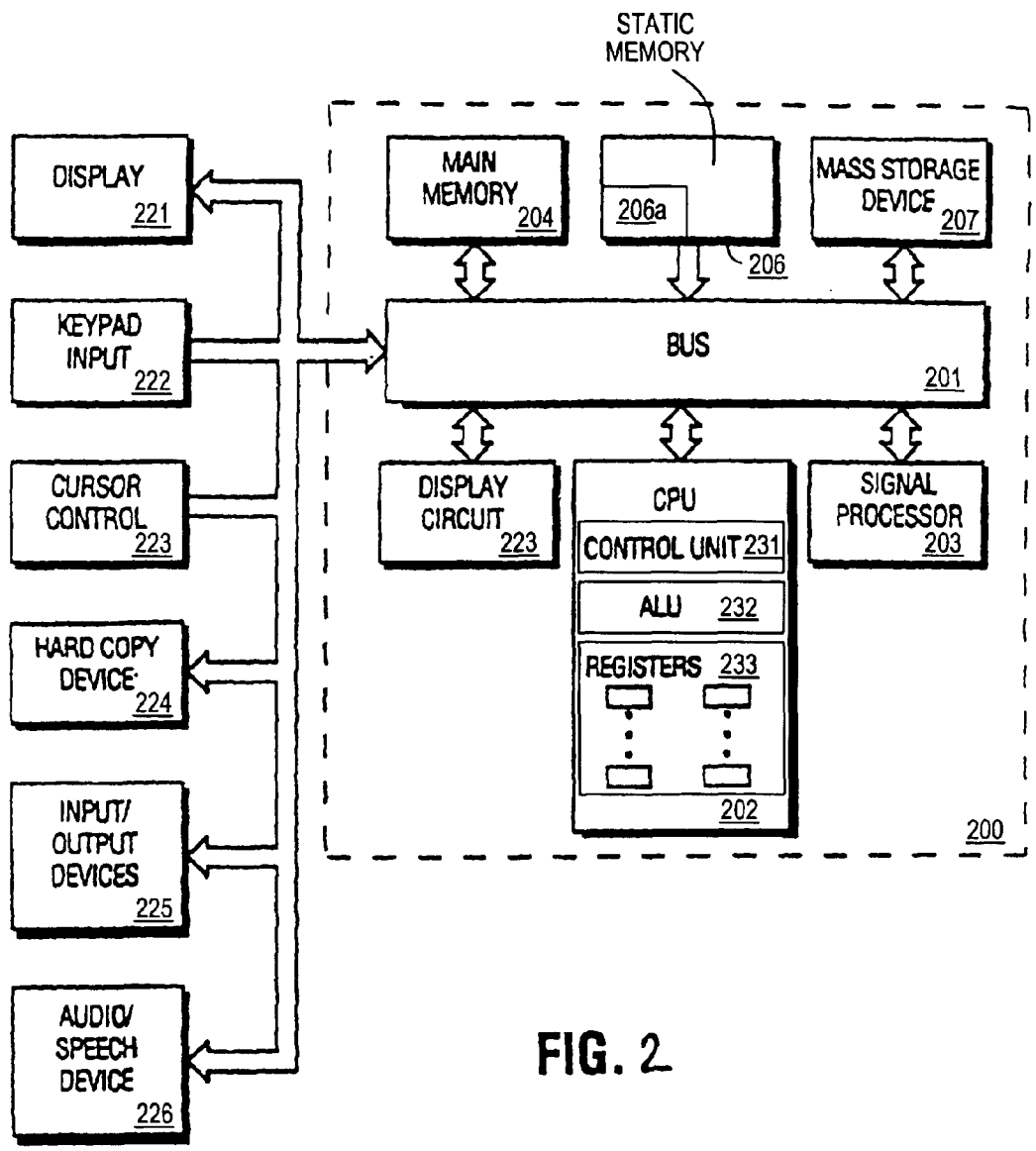
FIG. 2 illustrates an exemplary computing system for implementing one embodiment of the present invention.

FIG. 2 illustrates an exemplary computing system 200 for implementing one embodiment of an optical storage drive having a content-based drive-speed variation capability in accordance with the present invention. The multi-speed optical storage drive, the drive speed lookup table, and the motor control hardware registers described herein can be implemented and utilized within computing system 200, which can represent a MCS (e.g., a notebook computer), a general-purpose computer, or other like device. The components of computing system 200 are exemplary in which one or more components can be omitted or added. For example, one or more memory devices can be utilized for computing system 200.

Referring to FIG. 2, computing system 200 includes a central processing unit 202 and a signal processor 203 coupled to a display circuit 205, main memory 204, static memory 206, and mass storage device 207 via bus 201. Computing system 200 can also be coupled to a display 221, keypad input 222, cursor control 223, hard copy device 224, input/output (I/O) devices 225, and audio/speech device 226 via bus 201.

Bus 201 is a standard system bus for communicating information and signals. CPU 202 and signal processor 203 are processing units for computing system 200. CPU 202 or signal processor 203 or both can be used to process information and/or signals for computing system 200. CPU 202 includes a control unit 231, an arithmetic logic unit (ALU) 232, and several registers 233, which are used to process information and signals. Signal processor 203 can also include similar components as CPU 202.

Main memory 204 can be, e.g., a random access memory (RAM) or some other dynamic storage device, for storing information or instructions (program code), which are used by CPU 202 or signal processor 203. Main memory 204 may store temporary variables or other intermediate information during execution of instructions by CPU 202 or signal processor 203. Static memory 206, can be, e.g., a read only memory (ROM) and/or other static storage devices, for storing information or instructions, which can also be used by CPU 202 or signal processor 203. For example, static memory 206 may be used to store a drive-speed lookup table 206a in accordance with the present invention. Mass storage device 207 can be, e.g., a hard or floppy disk drive or optical disk drive, for storing information or instructions for computing system 200.

Display 221 can be, e.g., a cathode ray tube (CRT) or liquid crystal display (LCD). Display device 221 displays information or graphics to a user. Computing system 200 can interface with display 221 via display circuit 205. Keypad input 222 is a alphanumeric input device with an analog to digital converter. Cursor control 223 can be, e.g., a mouse, a trackball, or cursor direction keys, for controlling movement of an object on display 221. Hard copy device 224 can be, e.g., a laser printer, for printing information on paper, film, or some other like medium. A number of input/output devices 225 can be coupled to computing system 200. An optical storage drive having a content-based drive speed variation capability in accordance with the present invention can be implemented by hardware and/or software contained within computing system 200. For example, CPU 202 or signal processor 203 can execute code or instructions stored in a machine-readable medium, e.g., main memory 204.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Figure 3:
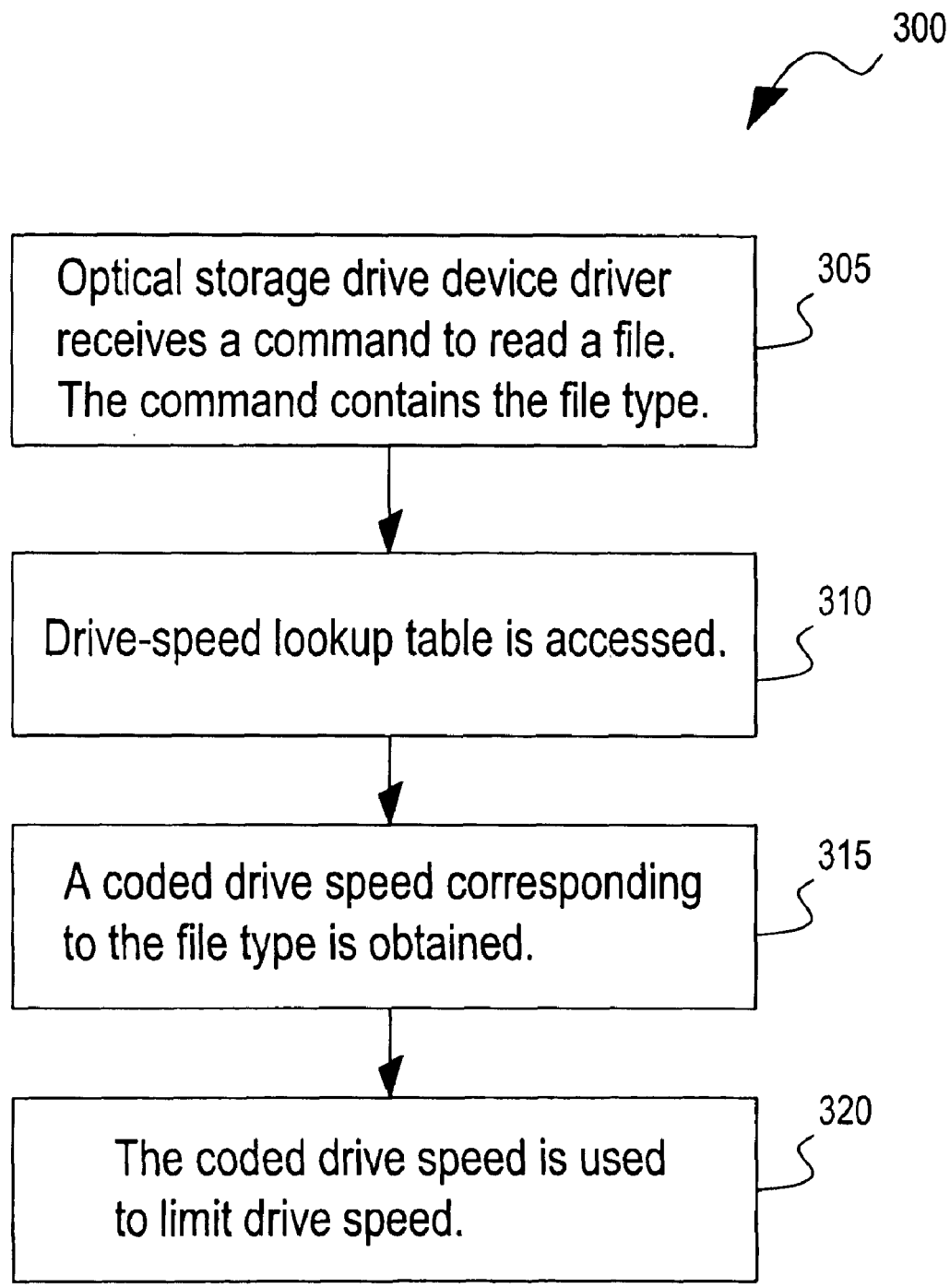
FIG. 3 illustrates a process flow diagram in accordance with one embodiment of the present invention.

FIG. 3 illustrates a process flow diagram in accordance with one embodiment of the present invention. Process 300, shown in FIG. 3, begins with operation 305 in which the device driver of an optical storage drive receives a command to read a file. The file type is included in the command.

At operation 310 a drive-speed lookup table is accessed. The drive-speed lookup table contains several coded drive-speeds corresponding to different file types. In one embodiment, a given speed corresponds to several file types of differing optical storage format. In an alternative embodiment each file type uniquely corresponds to a given speed.

At operation 315 a coded drive speed corresponding to the file type is obtained. For example, a file type of audio CD may correspond to a drive speed of 1X while a file type of DVD-ROM may correspond to a speed of 12X.

At operation 320 the coded drive speed is used to set the drive speed based on file type, as appropriate. In one embodiment the coded drive speed may be used to set the voltage supplied to the drive and thereby set the drive speed.

Figure 4:
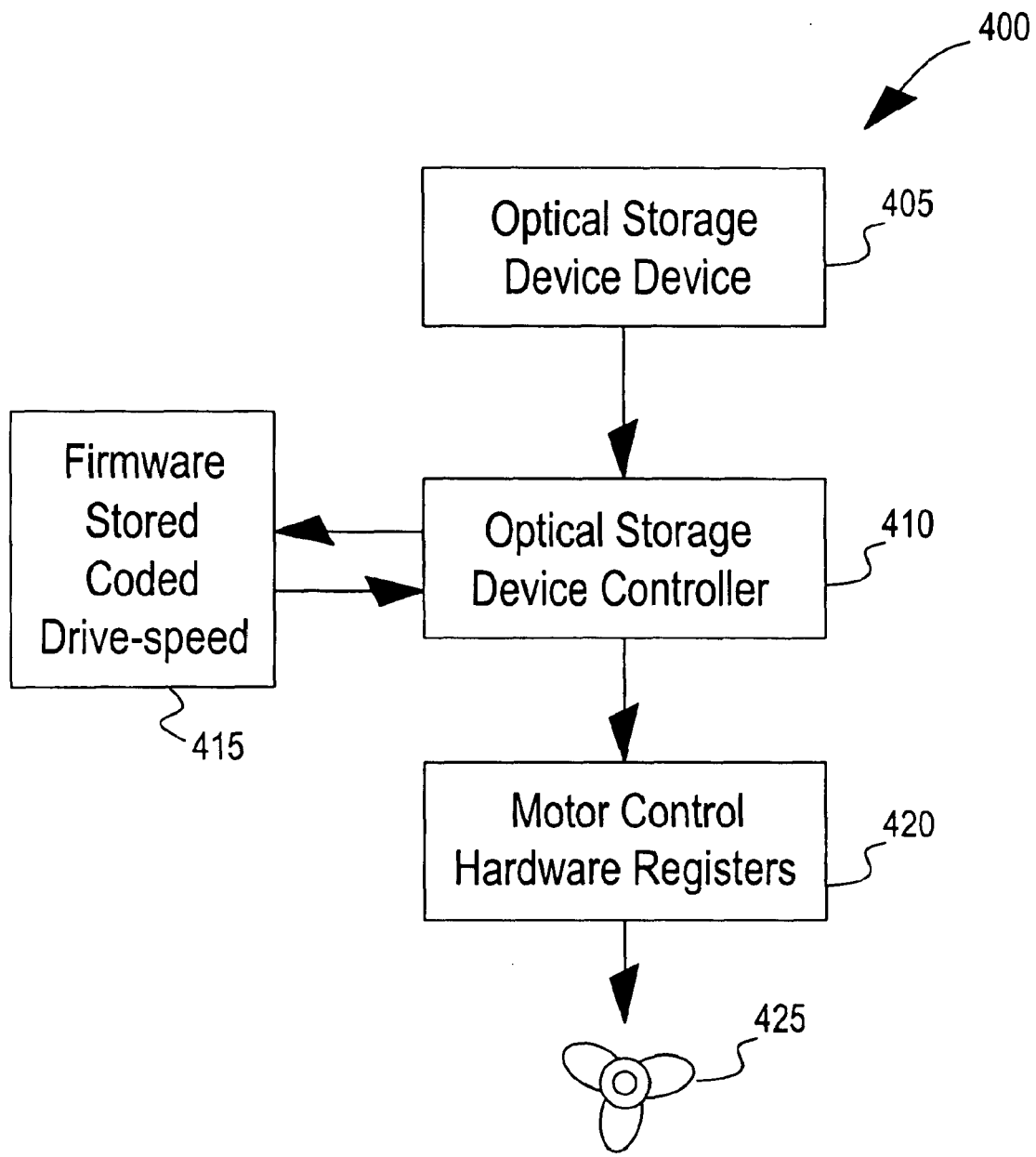
FIG. 4 is a block diagram of an optical storage drive system in accordance with one embodiment of the invention.

FIG. 4 is a block diagram of an optical storage drive system in accordance with one embodiment of the present invention. System 400, shown in FIG. 4, includes an optical storage device driver 405 coupled to an optical storage drive controller 410. The device driver 405 receives a command to read a file from, for example, a CPU, not shown. This command contains the file type that may be for example audio CD or DVD-RAM. The device driver 405 passes the file type to drive controller 410 as an index, for example, audio CD may have an index of 1 and DVD-RAM may have an index of 12. The drive controller accesses coded drive-speeds 415. The coded drive speeds 415 contain an indexed list of coded speeds. The coded drive speeds 415 may be stored in firmware that may be, for example, an EEPROM. The drive controller 410 may provide an index to the EEPROM that allows the drive controller 410 to read a specific location of the EEPROM containing a coded drive-speed. The index may correspond to a specific file type or alternatively may correspond to a group of file types. The drive controller 410 sends the coded drive-speed corresponding to the file type index to the motor control hardware registers 420. Based upon the coded drive-speed received, the motor control hardware registers may limit voltage to the drive 425, thereby regulating drive speed based on file type. For example, if the file type is audio CD, the motor control hardware registers may limit the drive voltage such that the drive rotates at approximately 500 RPMs. And if the file type is DVD-RAM, the motor control hardware registers may limit the drive voltage such that the drive rotates approximately 4000 RPMs.

In the foregoing specification, the invention has been described with reference to specific exemplary embodiments thereof. It will, however, be evident that various modifications and changes may be thereto without departing from the broader spirit and scope of the invention as set forth in the appended claims. The specification and drawings are, accordingly, to be regarded in an illustrative sense rather than a restrictive sense.

What is claimed is:

1. A method comprising:
   using an optical storage drive to read a file from an optical storage medium, the optical storage drive having a plurality of drive speeds;
   determining a drive speed from the plurality of drive speeds based upon a format of the file by accessing a coded drive-speed lookup table containing a plurality of coded drive speeds, each coded drive speed corresponding to a drive voltage; and
   supplying the drive voltage to the optical storage drive to set the drive speed.

2. The method of claim 1, wherein the file has a format selected from the group consisting of CD-DA, CD-ROM, CD-R, CD-RW, DVD-Video, DVD-ROM, and DVD-RAM.

3. The method of claim 1, wherein the plurality of drive-speeds comprises 1X, 2X, 4X, 8X, 10X, 12X, 16X, 20X, 24X, 32X, 40X, and 52X.

4. The method of claim 1 wherein the coded drive-speed lookup table is stored as firmware.

5. The method of claim 4, wherein the firmware is stored in a nonvolatile memory storage device.

6. A method comprising:

receiving to an optical storage device, a command to read a file from an optical storage medium, the command indicating a file type;

accessing a coded drive-speed lookup table, the coded drive-speed lookup table storing a plurality of drive-speeds, each drive-speed corresponding to at least one file type;

obtaining a coded drive-speed corresponding to the file type, the coded drive speed corresponding to a drive voltage; and operating a drive of the optical storage device by supplying the drive voltage to the drive of the optical storage device to set the drive speed.

7. The method of claim 6, wherein the file type is selected from the group consisting of CD-DA, CD-ROM, CD-R, CD-RW, DVD-Video, DVD-ROM, and DVD-RAM.

8. The method of claim 6, wherein the plurality of drive-speeds comprises 1X, 2X, 4X, 8X, 10X, 12X, 16X, 20X, 24X, 32X, 40X, and 52X.

9. The method of claim 6, wherein the coded drive-speed lookup table is stored as firmware.

10. The method of claim 9, wherein the firmware is stored in a nonvolatile memory storage device.

11. A machine-readable medium that provides executable instructions which, if executed by a processor, will cause said processor to perform operations comprising:

reading a file from an optical storage medium using an optical storage drive, the optical storage drive having a plurality of drive speeds;

determining a drive speed from the plurality of drive speeds based upon a format of the file by accessing a coded drive-speed lookup table, containing a plurality of coded drive speeds, each coded drive speed corresponding to a drive voltage; and supplying the drive voltage to the optical storage drive to set the drive speed.

12. The machine-readable medium of claim 11, wherein the format of the file is selected from the group consisting of CD-DA, CD-ROM, CD-R, CD-RW, DVD-Video, DVD-ROM, and DVD-RAM.

13. The machine-readable medium of claim 11, wherein the plurality of drive-speeds comprises 1X, 2X, 4X, 8X, 10X, 12X,16X, 20X, 24X, 32X, 40X, and 52X.

14. The machine-readable medium of claim 11 wherein the coded drive-speed lookup table is stored as firmware.

15. The machine-readable medium of claim 14, wherein the firmware is stored in a nonvolatile memory storage device.

16. The machine-readable medium of claim 15, wherein the nonvolatile memory storage device is selected from the group consisting of: a ROM, a PROM, an EPROM, an EEPROM, and flash memory.

17. An apparatus comprising:

an optical storage drive device driver to receive a command to read a file from an optical storage medium, the file having a file type;

a firmware having stored therein a plurality of coded drive-speeds, each coded drive-speed corresponding to at least one file type, each coded drive speed corresponding to a drive voltage;

a controller to access the firmware and obtain a coded drive-speed corresponding to the file type; and a motor control hardware register to receive the coded drive-speed, the motor control hardware register limiting a drive voltage to a drive of the optical storage device to the drive voltage corresponding to the coded drive speed, such that the drive operates at a speed indicated by the coded drive-speed.

18. The apparatus of claim 17, wherein the file type is a type selected from the group consisting of CD-DA, CD-ROM, CD-R, CD-RW, DVD-Video, DVD-ROM, and DVD-RAM.

19. The apparatus of claim 17, wherein the plurality of coded drive-speeds comprises 1X, 2X, 4X, 8X, 10X, 12X, 16X, 20X, 24X, 32X, 40X, and 52X.

20. The apparatus of claim 17, wherein the firmware is stored in a nonvolatile memory storage device.

21. The apparatus of claim 20, wherein the nonvolatile memory storage device is selected from the group consisting of: a ROM, a PROM, an EPROM, an EEPROM, and flash memory.

22. The system of claim 21, wherein the coded drive-speed lookup table is stored as firmware.

23. The system of claim 22, wherein the firmware is stored in a nonvolatile memory storage device.

24. The system of claim 23, wherein the nonvolatile memory storage device is selected from the group consisting of: a ROM, a PROM, an EPROM, an EEPROM, and flash memory.

25. A system comprising:

a processor;

an optical storage drive; and a memory coupled to the processor, the memory having stored therein, executable instructions which, when executed by the processor, cause the processor to perform operations comprising, determining a content of an optical storage medium currently inserted in the optical storage drive;

setting a drive speed of the optical storage drive based upon the content of the optical storage medium by accessing a coded drive-speed lookup table containing a plurality of coded drive speeds, each coded drive speed corresponding to a drive voltage; and supplying the drive voltage to the optical storage drive to set the drive speed.

26. The system of claim 25, wherein the content of the optical storage medium has a format, the format selected from the group consisting of CD-DA, CD-ROM, CD-R, CD-RW, DVD-Video, DVD-ROM, and DVD-RAM.

27. The system of claim 25, wherein the drive speed is a speed selected from the group consisting of: 1X, 2X, 4X, 8X, 10X, 12X, 16X, 20X, 24X, 32X, 40X, and 52X.

* * * * *

UNITED STATES PATENT AND TRADEMARK OFFICE
CERTIFICATE OF CORRECTION

PATENT NO. : 6,859,858 B2
DATED : February 22, 2005
INVENTOR(S) : Green

It is certified that error appears in the above-identified patent and that said Letters Patent is hereby corrected as shown below:

Column 2,
Line 35, before "invention", insert -- presents --.

Column 4,
Line 39, before "appoximately", insert -- at --.

Signed and Sealed this

Twenty-fourth Day of May, 2005

JON W. DUDAS
*Director of the United States Patent and Trademark Office*